US010412369B2

(12) United States Patent
Aurongzeb et al.

(10) Patent No.: US 10,412,369 B2
(45) Date of Patent: Sep. 10, 2019

(54) METHOD AND APPARATUS FOR COMPENSATING FOR CAMERA ERROR IN A MULTI-CAMERA STEREO CAMERA SYSTEM

(71) Applicant: Dell Products, LP, Round Rock, TX (US)

(72) Inventors: Deeder M. Aurongzeb, Austin, TX (US); Maxwell Andrews, San Francisco, CA (US)

(73) Assignee: Dell Products, LP, Round Rock, TX (US)

( * ) Notice: Subject to any disclaimer, the term of this patent is extended or adjusted under 35 U.S.C. 154(b) by 715 days.

(21) Appl. No.: 14/815,614

(22) Filed: Jul. 31, 2015

(65) Prior Publication Data
US 2017/0034502 A1 Feb. 2, 2017

(51) Int. Cl.
| | |
|---|---|
| G06T 7/80 | (2017.01) |
| H04N 13/246 | (2018.01) |
| H04N 13/106 | (2018.01) |
| H04N 13/15 | (2018.01) |
| H04N 13/189 | (2018.01) |
| H04N 13/243 | (2018.01) |
| H04N 13/00 | (2018.01) |
| H04N 13/128 | (2018.01) |

(52) U.S. Cl.
CPC ............ *H04N 13/246* (2018.05); *G06T 7/80* (2017.01); *G06T 7/85* (2017.01); *H04N 13/106* (2018.05); *H04N 13/15* (2018.05); *H04N 13/189* (2018.05); *H04N 13/243* (2018.05); *H04N 13/128* (2018.05); *H04N 2013/0081* (2013.01)

(58) Field of Classification Search
CPC .......... H04N 13/0246; G06T 7/85; G06T 7/80
See application file for complete search history.

(56) References Cited

U.S. PATENT DOCUMENTS

| | | | | |
|---|---|---|---|---|
| 9,609,305 | B1* | 3/2017 | Ramaswamy | H04N 13/246 |
| 9,734,419 | B1* | 8/2017 | Ye | G06T 7/00 |
| 2010/0208034 | A1* | 8/2010 | Chen | H04N 13/239 348/46 |
| 2011/0080401 | A1* | 4/2011 | Tan | H04N 13/0018 345/419 |

(Continued)

*Primary Examiner* — Rebecca A Volentine
(74) *Attorney, Agent, or Firm* — Prol Intellectual Property Law, PLLC; H. Kenneth Prol (57) ABSTRACT

A system and method multi-camera error compensation including recording a plurality of raw images via a plurality of digital cameras and an application processor processing with a multi-view stereo imaging system one or more plural image frames from the raw images captured by the plurality of digital cameras. The plural images may be stored in memory and the detection conducted for calibration loss of at least one digital camera via the processor executing instructions for a multi-camera error compensating system to determine loss of calibration in plural images. The multi-camera error compensating system conducts dynamic recalibration of plural image calibration parameters based on at least one plural image frame and in response to detection of calibration loss via the multi-camera error compensating system and a processor reprocesses the plural image frame from a reprocessing queue according to the recalibrated plural image parameters.

20 Claims, 6 Drawing Sheets

(56) References Cited

U.S. PATENT DOCUMENTS

| | | | |
|---|---|---|---|
| 2011/0157373 A1* | 6/2011 | Ye | G06T 7/85 348/187 |
| 2011/0211045 A1* | 9/2011 | Bollano | G06T 15/20 348/46 |
| 2012/0194652 A1* | 8/2012 | Myokan | H04N 13/0022 348/50 |
| 2013/0250062 A1* | 9/2013 | Tin | H04N 13/0018 348/46 |
| 2014/0125771 A1* | 5/2014 | Grossmann | H04N 13/0246 348/47 |
| 2015/0009291 A1* | 1/2015 | Cheng | H04N 13/296 348/46 |
| 2015/0124059 A1* | 5/2015 | Georgiev | G06T 7/002 348/47 |
| 2015/0213589 A1* | 7/2015 | Chou | G06T 7/002 348/47 |
| 2015/0334380 A1* | 11/2015 | Kim | H04N 13/349 348/54 |
| 2016/0277650 A1* | 9/2016 | Nagaraja | H04N 5/217 |

* cited by examiner

METHOD AND APPARATUS FOR COMPENSATING FOR CAMERA ERROR IN A MULTI-CAMERA STEREO CAMERA SYSTEM

FIELD OF THE DISCLOSURE

This disclosure generally relates to information handling systems, and more particularly relates to a method and apparatus for error compensation for multi-camera systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Many current information handling systems include integrated camera systems for recording images.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system, such as mobile information handling systems including personal computer (e.g., desktop or laptop), tablet computer, mobile device (e.g., personal digital assistant (PDA) or smart phone), or other mobile computing platform including wearable computing platforms may include a plurality of digital camera systems serving numerous functions. In an embodiment, an information handling system may include a multi-view stereo imaging system operating with the plurality of digital camera systems. In various embodiments, two digital cameras may be used, more than two digital cameras may be used, or a compound digital camera with plural image sensors may be used with the multi-view stereo imaging system of the present disclosure. Hereinafter, a plurality of digital camera systems shall include a compound camera with plural image sensors.

In an aspect, multi-view stereo imaging systems in information handling systems with a plurality of digital cameras may require precision alignment and calibration to conduct a variety of plural imaging functions including three dimensional (3D) imaging operations. Misalignment or loss of calibration of one or more of the plurality of digital cameras can lead to incorrect operation of plural imaging functions. In information handling systems, for example consumer mobile devices, maintaining alignment over a long period of time may be impractical. This is due to normal wear and tear, traumatic events, thermal events, and many other factors during the course of usage of the information handling system. A multi-view stereo imaging system with a plurality of digital cameras may however be recalibrated after usage causes misalignment or loss of calibration. Manual calibration of the multi-view stereo imaging system or the plurality of digital cameras, such as embedded cameras in an information handling system, may be unwieldy or difficult in the information handling system with a plurality of digital cameras. Recalibration may occur via a multi-camera error compensating software system according to the present disclosure to adjust plural imaging frame parameters to recalibrate plural imaging functions, including 3D imaging operation. In an embodiment, the multi-camera error compensating software system may operate nearly invisibly to determine if calibration of plural image frames is within identified tolerances for specific plural imaging functions to identify loss of calibration or alignment. Notification of the loss of calibration may occur in one aspect of the multi-camera error compensating software system. Recalibration may take place in accordance with a user's instructions in another aspect of the disclosure.

In one embodiment, the multi-camera error compensating software system may conduct dynamic recalibration with minimal user interaction. Such a solution is a user friendly multi-camera error compensating software system in an aspect of the present disclosure to assist in limiting needed user input while maintaining calibration of the multi-view stereo imaging system if camera error occurs. With a dynamic recalibration embodiment of the multi-camera error compensating software system, the dynamic recalibration of the plural imaging data from the multi-view stereo imaging system may be conducted based on analysis of one or more plural images taken and compared to determine error of calibration parameters with respect to the digital camera systems. Then dynamic recalibration of the plural image calibration parameters maybe be conducted to modify calibration parameters for plural image frames as error compensation for digital camera misalignment or other errors in another aspect of the disclosure. In some embodiments, a plurality of test plural images may be used to increase confidence of the calibration update. In an embodiment, the test plural images may be plural image frames previously taken and stored by the multi-view stereo imaging system. Plural images may also include the plurality of raw images recorded by the plurality of digital cameras prior to consolidation into a plural image frame. These raw image components may serve as test plural images as well. Upon dynamic recalibration with the multi-camera error compensating software system, one or more plural image frames taken prior to recalibration may be reprocessed to correct errors from decalibration. This may be done seamlessly, however problems may arise if a plural image frame taken during a state of decalibration is modified before reprocessing. The multi-view stereo imaging system may detect user action to modify plural image frames and elect not to reprocess modified plural image frames with new calibration parameters after dynamic recalibration.

For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system 100 is illustrated in FIG. 1, the term "system" shall also be taken to include any collection of systems or sub-systems that individually or jointly execute a set, or multiple sets, of instructions to perform one or more computer functions.

Figure 1:
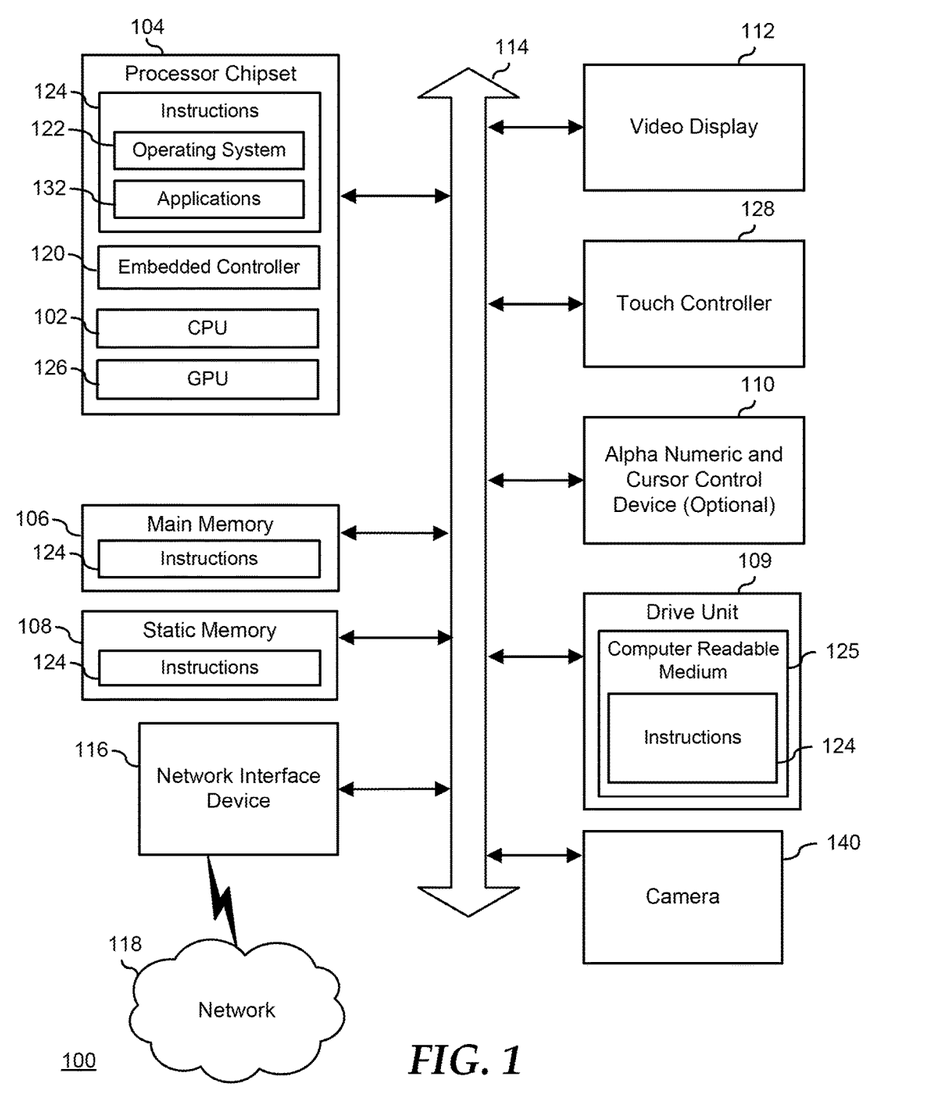
FIG. 1 is a block diagram illustrating an information handling system according to an embodiment of the present disclosure.

FIG. 1 shows a block diagram of an information handling system 100 capable of administering each of the specific embodiments of the present disclosure. For purpose of this disclosure information handling system 100 can include any instrumentality or aggregate of instrumentalities as described above, and operates to perform one or more of the methods described herein. Further, information handling system 100 can include processing resources for executing machine-executable code instructions 124 of an operating system 122 and various applications 132. Processing resources may include a central processing unit (CPU) 102, a programmable logic array (PLA), an embedded device such as a System-on-a-Chip (SoC), or other control logic hardware. Information handling system 100 can also include one or more computer-readable medium types for storing machine-executable code, such as software, or data. Additional components of information handling system 100 can include one or more storage devices 106, 108, and 109 that can store machine-executable code or data on various computer-readable medium types, one or more communications ports for communicating with external devices, and various input and output (I/O) devices connected via I/O interfaces. I/O devices may include one or more alpha numeric or cursor control devices 110 including keyboards, mice, touchpads, and touch screens. Additional input and output (I/O) devices include video displays 112, digital camera systems 140, signal generating systems and signal receiving systems (not shown) such as sound, infrared, visible light, or radiofrequency signal systems. Information handling system 100 can also include one or more buses 114 operable to transmit information between the various hardware components.

In an example embodiment, information handling system 100 includes one or more chipsets 104. Chipset 104 in an embodiment may include one or more processors 102, embedded controllers 120, and graphics processing systems such as a graphics processing unit (GPU) 126 among other controllers or processors as specified. In example aspects, the chipset 104 may interface with main memory 104 to utilize and process machine-executable code instructions 124. Main memory 104 may include RAM memory or other memory to store machine-executable code instructions 124 for processing. One or more buses 114 may connect chipset 104 or other processing resources to memory including static memory 108 such as flash memory, or a drive unit 109 such as a disk drive, ROM or other memory. Main memory 106, static memory 108, drive unit 109 may each contain varied types of computer readable medium. For example, drive unit 109 may include a computer readable medium shown as 125 of a variety of sorts known in the art. Each of main memory 106, static memory 108, or drive units 109 may store instructions 124 for the information handling system. Drive unit 109 or static memory 108 may also be controlled by a disk controller or a disk emulator if peripheral to the information handling system. Information handling system 100 can further include a network interface device 116 for connection to network 118.

Processor 102 and processor chipset 104 is operatively coupled to memory 106 via memory bus. GPU 126 may also be operatively coupled to processor 102 via a graphics interface and provides a video display output to one or more video displays 112. Video display 112 is connected to touch controller 128 via touch controller interface. In a particular embodiment, information handling system 100 includes separate memories that are dedicated to processor 102 via separate memory interfaces. An example of memory 106 includes random access memory (RAM) such as static RAM (SRAM), dynamic RAM (DRAM), non-volatile RAM (NV-RAM), or the like, read only memory (ROM), another type of memory, or a combination thereof. Memory 106 can store, for example, at least one application 132 and operating system 122. Operating system 122 includes operating system code operable to detect resources within information handling system 100, to provide drivers for the resources, initialize the resources, to access the resources, and to support execution of the at least one application 132. Operating system 122 has access to system elements via an operating system interface, and may include interface with device drivers.

Graphics interfaces, disk controllers, and I/O interfaces, peripheral interfaces, network interface controllers and other interfaces of the information handling system 100 are operatively coupled to chipset 104 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof according to various embodiments. Chipset 104 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof in certain embodiments. An example of disk interface with static memory 108 or drive unit 109 includes an IEEE 1194 (Firewire) interface, Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof in various embodiments. Alternatively, static memory 108 or drive unit 109 can be disposed within information handling system 100.

Network interface device 116 disposed within information handling system 100 may be located on a main circuit board of the information handling system, integrated onto another component such as chipset 104, in another suitable location, or a combination thereof. Network interface device 116 is connected to chipset 104 via one or more buses 114. Network interface device 116 includes one or more network channels that provide interfacing to devices and other information handling systems that are external to information handling system 100. In a particular embodiment, network channels may be wired, wireless, or a combination of the same as is understood by those of skill in the art. An example of network channels includes wireless telecommunication and data connectivity such as LTE, UMTS/EDGE, EDGE/GSM, CDMA wireless communication standards known in the art. Other example network channels include WiMax, Wi-Fi, Bluetooth, InfiniBand channels, Fibre Channel channels, Gigabit Ethernet channels, proprietary channel architectures, or a combination thereof. Network channel can be connected to external network resources available to the information handling system (not illustrated). The network resources can include another information handling system, a data storage system, another network, a grid management system, another suitable resource, or a combination thereof.

In accordance with at least one embodiment, camera 140 of information handling system 100 comprises one or more digital cameras with three-dimensional (3D) imaging capability. As an example embodiment, the camera 140 can be an INTEL® REALSENSE™ 3D camera or another 3D camera. In an aspect, camera 140 may have multiple camera elements or be a plurality of digital cameras 140 at diverse locations to yield parallax information can be used to determine distances of image elements from the camera. As another aspect, a camera 140 may have a focusable lens to yield differences in sharpness at different distances can be used to determine distances of image elements from the camera.

Information handling system 100 includes instructions 124 to be executed by processor 102 and stored in memory 106, which is connected to processor 102. Processor 102 is coupled, for example, via chipset 104 and one or more buses 114 to the one or more cameras 140. A digital camera 140 can record a first raw image of a scene. The instructions 124 cause processor 102 to record a second raw image of the scene from another image sensor or digital camera 140. The second raw image may record the scene from a different angle. Any number of a plurality of raw images may be recorded by a plurality of digital cameras 140, and the digital cameras 140 are contemplated as having different parallax angles known to the system. The instructions cause processor 102 to construct a composite image based on at least a portion of the first, second, and other raw images for the at least one of the plurality of image elements. The composite image may be referred to as a plural image frame of the scene. In an example embodiment, the instructions may cause three-dimensional (3D) image processing that may correlate distances within the plural image frame, exposure levels, and focal levels over a plurality of image elements or objects within the plural image frame. The instructions cause processor 102 to utilize plural image calibration parameters in processing raw images into a plural image frame. Example plural image calibration parameters include depths, rotation, fields of view, focal lengths and other calibration factors for processing the plural image frame from raw images. In an aspect, this may include 3D image processing for the plural image frames to establish distances of elements or objects within a plural image frame.

In accordance with at least one embodiment, the instructions 124 cause processor 102 to detect when an image is recorded and one or more plural image calibration parameters is out of calibration. In accordance with at least one embodiment, the instructions 124 cause processor 102 to conduct dynamic recalibration of plural image calibration parameters to correct misalignment or other loss of calibration of one or more digital cameras 140. In accordance with at least one embodiment, the instructions 124 cause processor 102 to determine if one or more plural image frames are out of calibration. In accordance with at least one embodiment, the instructions 124 cause processor 102 to determine if one or more plural image frames that are out of calibration have been modified by a user. In accordance with yet another embodiment, the instructions 124 cause processor 102 to add one or more plural image frames to a reprocessing queue. In accordance with at least one additional embodiment, the instructions 124 cause processor 102 to reprocess one or more plural image frames that are out of calibration according to recalibrated plural image calibration parameters. Additional detail for methods or portions of methods for the above described embodiments is discussed further herein.

Figure 2:
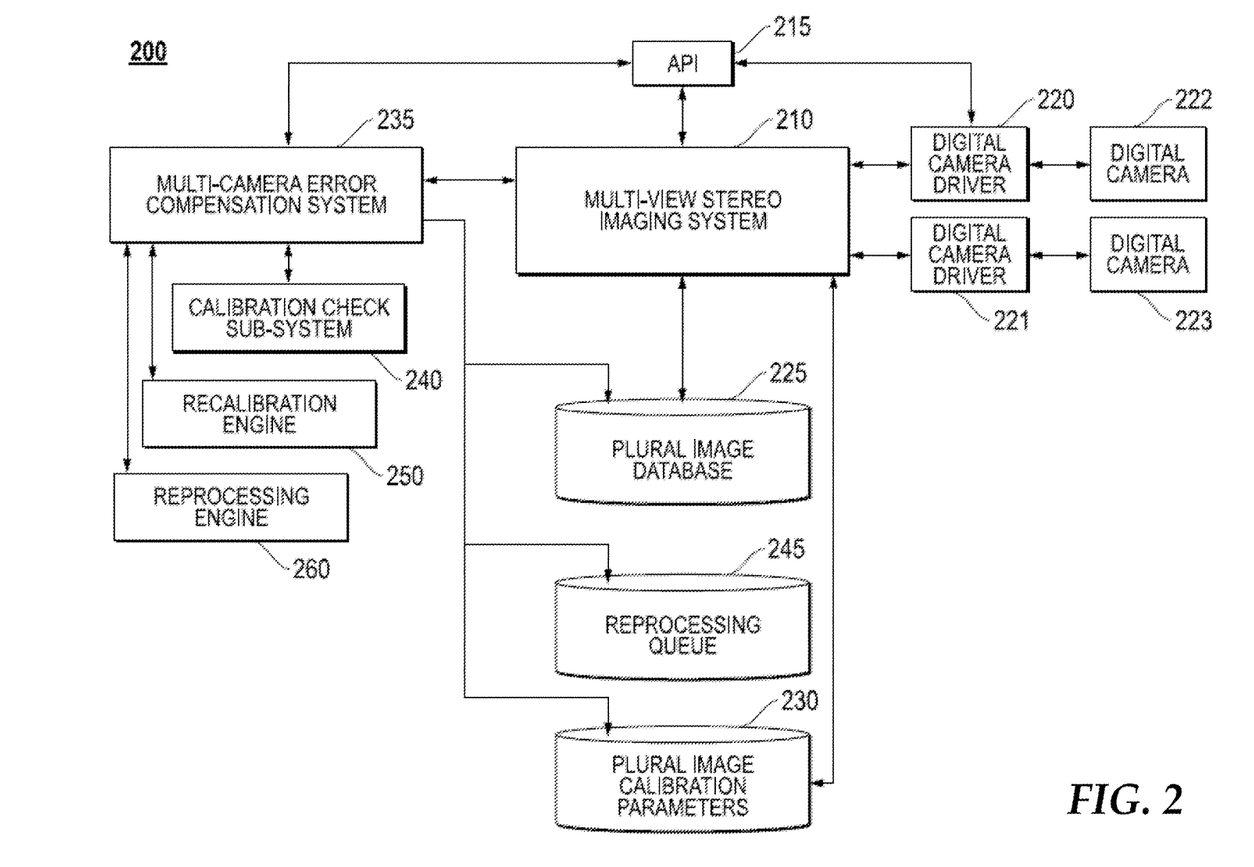
FIG. 2 a block diagram illustrating a multi-view stereo imaging system with multi-camera error compensation according to an embodiment of the present disclosure.

FIG. 2 shows a block diagram of a multi-view stereo imaging system 200 with multi-camera error compensation according to one embodiment of the present disclosure. The various aspects of the multi-view stereo imaging system 200 are capable of administering each of the specific embodiments of the present disclosure via execution of code instructions run on a CPU or embedded controller in the chipset(s) of one or more information handling systems as described above. The multi-view stereo imaging system 200 may be implemented as one or more modules of executable software code. The multiview stereo imaging system core module 210 coordinates collection of a plurality of raw images and consolidation of those images in to a plural image frame. The multiview stereo imaging system core 210 may conduct additional processing of plural image frames including 3D processing to determine depth calculations for pixels representing points and objects within a scene of the plural image frame.

The application programming interface (API) 215 may coordinate all code instruction modules that comprise the multiview stereo imaging system 200 and code instructions that function on the information handling systems such as operating system, device drivers, applications and other software code instructions that may operate in the information handling system. The multiview stereo imaging system core 210 interfaces with the API 215 found in the information handling system software to coordinate various software applications and hardware including the digital camera hardware drivers 220 and 221 operating a plurality of digital cameras 222 and 223 for recording raw images by the information handling system. As explained earlier, it is understood that a plurality of digital camera systems are contemplated and may include two or more digital camera systems in various embodiments. An example API system embodiment may include a Win 32 API or other API software systems as understood in the art. It is further understood that while several distinct code instruction modules are depicted in FIG. 2, that is for illustrative purposes and the software architecture may be employed with one software code module or a plurality of software code modules in addition to what is shown in FIG. 2. Further, it is understood that functionality or operation described for any one of the code instruction modules may be performed by a different instruction code module or a combination of any instruction code modules or sub-systems.

In an example embodiment, the API 215 may coordinate the multiview stereo imaging system core 210, a multi-camera error compensating system 235, and digital camera device drivers 220 and 221. The multiview stereo imaging system 200 similarly has a plurality of data repositories including a database for storing plural image frames 225, a database for plural image parameters 230, and a reprocessing queue 245 for plural image frames designated as decalibrated and available for reprocessing after dynamic recalibration of plural image parameters. It is understood that the above described databases may be separate or combined into one or more databases or may be distributed among several memory locations in any architecture.

The multiview stereo imaging system 200 operates via a multi-camera error compensating system 235 to determine if digital camera systems 222 and 223 are operating out of calibration. Loss of calibration may occur due to a variety of factors including from mechanical movement or contortion of digital camera systems 222 and 223, thermal action, or digital or electronic errors in camera function. Mechanical movement or contortion may take place due to vibration, mechanical drops, heat, or other factors to cause digital camera systems 222 and 223 to move out of alignment. Such camera errors will cause errors during consolidation of raw images recorded via digital camera systems 222 and 223 into plural image frames. Plural image calibration parameters used to consolidate raw images will no longer function as originally calibrated. A calibration check sub-system 240 will operate with the multi-camera error compensating to detect loss of calibration in acquired plural image frames indicating digital camera system error or other errors. The multi-camera error compensating system 235 may also apply dynamic recalibration with a recalibration engine 250 to plural image calibration parameters to correct the issues detected. In an example aspect, the recalibration engine 250 may recalibrate the plural image calibration parameters using the altered alignment of digital camera systems 222 and 223 based on the recorded raw images of one or more plural image frames. In another example aspect, certain plural image frames detected as out-of-calibration may be reprocessed with new plural image calibration parameters via a reprocessing engine 260 of the multi-camera error compensating system. In some embodiments, the above sub-systems may be part of the multi-camera error compensating system 235. In other embodiments, it is understood that code instructions executable by a processor for systems 240, 250, and 260 may be independent from one another and operation may be coordinated via API 215.

In some aspects, some or all of the multiview stereo imaging system 200 may coordinate raw image data, plural image data, or plural image calibration parameters across a network to a remote location for image processing or dynamic recalibration. For example, the multiview stereo imaging system core 210 may report some or all of the raw images, stereo images, or plural image calibration parameters via a network interface (NIC) to a remote information handling system or remote data repository.

Figure 3:
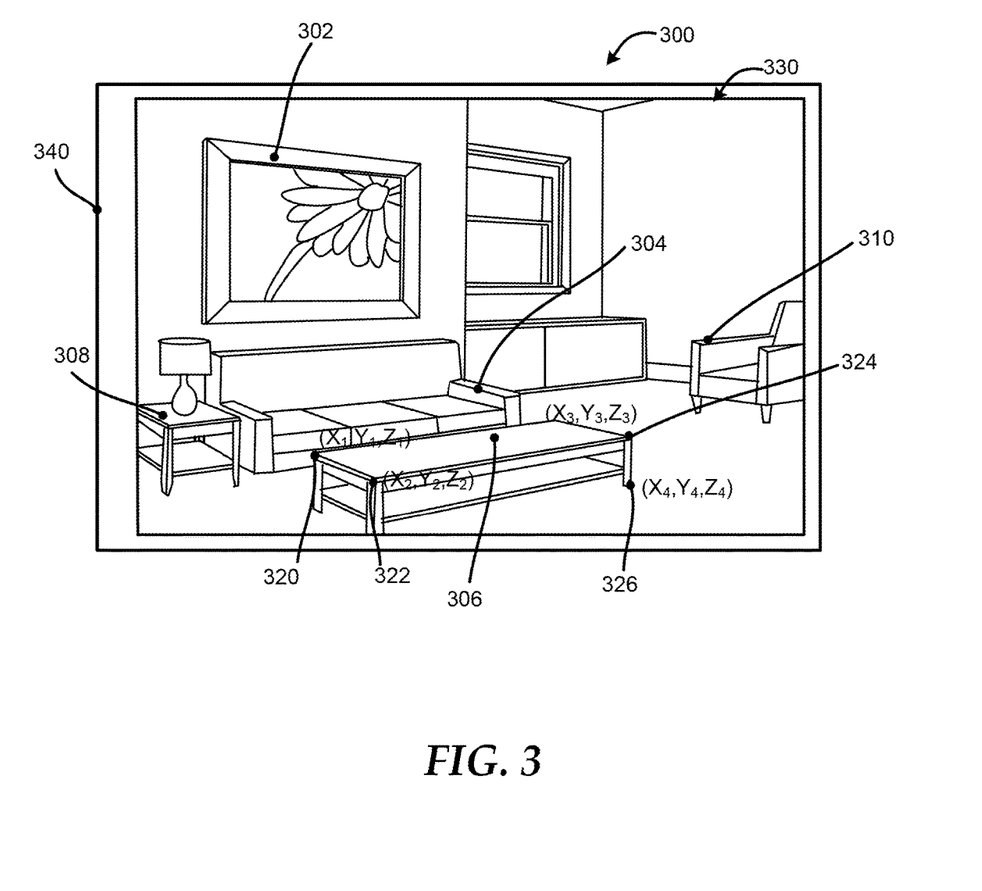
FIG. 3 is a display image diagram illustrating an image of a scene having objects at different distances recorded from one or more digital cameras according to an embodiment of the present disclosure.

FIG. 3 is a display image diagram illustrating an image of a scene having objects at different distances from an information handling system having a plurality of digital camera systems, wherein the objects are represented by image elements, according to an embodiment of the present disclosure. Image 300 comprises a scene having objects 302 through 308 as example objects within the scene of image 300. In an example embodiment, image 300 may be displayed on a display screen 330 of an information handling system 340 such as a tablet computing system. Objects 302 through 308 are located at a variety of distances and ranges of depth of distance. In an example embodiment, the plurality of digital camera systems may operate as a 3D camera with 3D image processing via the multiview stereo imaging system described in the present disclosure. For example, object 302, which represents a picture, is in a moderate background. Object 304, which represents a couch, is illustrated as also in the moderate background. Object 306, which represents a coffee table, is illustrated in a near foreground. Object 308, which represents an end table is also in the moderate foreground, in a less extreme foreground position than object 306. Object 310, which represents a chair, is in a background relative to object 306. Additional objects are shown in the scene of image 300, but not discussed.

The three-dimensional relationships illustrated in FIG. 3 can be discussed with respect to x, y, and z axes, wherein the x axis is defined as being a horizontal axis, the y axis is defined as being a vertical axis, and the z axis is defined as being a distance axis along a path through the plane of image 300 away from a point of view of the plurality of digital camera systems capturing image 300. In accordance with at least one embodiment, using distance information obtained from the plurality of digital camera systems, the distances of image elements, such as pixels, of image 300 from the plurality of digital camera systems can be determined. Processing raw image recordings from the plurality of digital camera systems via the multiview stereo imaging system of the present disclosure permits consolidation of the raw images into a plural image frame. Patterns of such image elements, for example, image elements within the region occupied by object 306, can be recognized, for example, by their proximity in x, y, z space. Once recognized, such patterns can be used to identify objects, such as object 306 and its relation to other objects, such as objects 302, 304, 308 and 310, in the x, y, z space. Image distance coordinates in x, y, z space may be identified at points along an object according to x, y, z coordinates associated with a pixel or pixels at that location in image 300. For example, coordinate distance point $(X_1, Y_1, Z_1)$ is shown at 320. The coordinate distance point $(X_2, Y_2, Z_2)$ is shown at 322, coordinate distance point $(X_3, Y_3, Z_3)$ is shown at 324, and coordinate distance point $(X_4, Y_4, Z_4)$ is shown at 326. As is understood, additional image processing can be performed with respect to each identified object or plurality of objects that are at particular z distance or range of z distances. For example, distances between x, y, z coordinate points may be measurable. As an additional example, objects in space within plural image frames may be identified as objects based on edges. Misalignment of digital cameras or loss of calibration may have substantial impact with undesirable consequences on the accuracy of processed plural image frames therefore, including plural images with 3D image processing.

Figure 4:
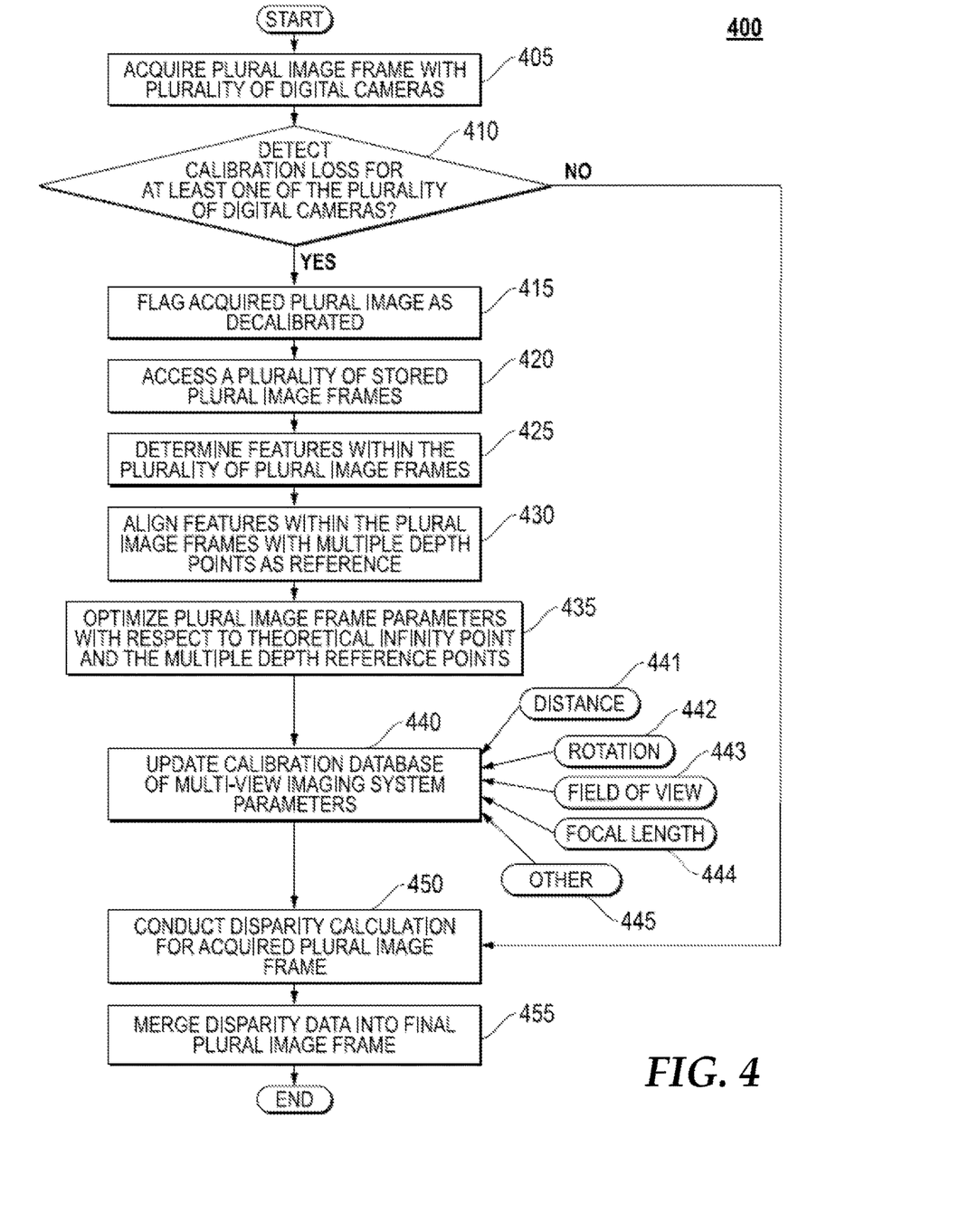
FIG. 4 is a flow diagram illustrating a method of dynamic calibration via a multi-camera error compensation system according to an embodiment of the present disclosure.

FIG. 4 is a flow diagram illustrating a method of detecting a plural image frame out of calibration and providing recalibration of plural image parameters for consolidating or merging raw images into a plural image frame according to an embodiment of the present disclosure. In accordance with at least one embodiment, a method is performed in an information handling system having a plurality of digital camera systems. Method 400 begins in block 405 where the plurality of digital camera systems acquires raw images and the raw images are processed into a merged plural image frame. In an example embodiment, the processing of the raw images from the plurality of digital camera systems is conducted by a multi-view stereo imaging system. The processing may include 3D processing for depth within a plural image frame resulting from merger of the raw image frames. As is understood in some embodiments, raw images may be acquired, the raw images may be rectified to align them according to reference points, field of view, rotation, and other factors. Then, in an embodiment, a disparity map is determined to provide reference for pixels within the images relative to parallax angles for the plurality of digital cameras relative to points or objects within the plural images. Calculation of a disparity map will rely on plural image calibration parameters. This disparity information is used to merge the two raw images into a plural image frame with depth parameters, color, and pixel coordinate information for the plural image frame pixels. It is understood additional processing may occur with respect to determination of plural image frames from the recorded raw images at 405.

From block 405, method 400 proceeds to decision block 410. In decision block 410, a calibration check sub-system may be initiated with respect to one or more stored plural image frames. The calibration check sub-system may be routinely initiated or initiated on a periodic basis. A calibration check system will analyze correspondences between a plurality of raw images respect to image size, shape, distortion, rotation and other aspects. Comparison of overall image size, shape, distortion, rotation and other aspects between raw images may reveal changes in alignment between digital cameras.

Correspondences between the plurality of images may also be compared relative to features within the images such as corners or edges unique to an area of the image in an example embodiment. The calibration check system may determine if aspects of the area having identifiable features are similar between raw images to identify features for comparison. For example, aspects may include intensity levels, contrast changes, and color profiles. If several are similar, this can match to an image feature. Then assessment may take place relating to values of coordinates between features in different areas of the raw images. Assessment may be made with respect to relationship between two features in the raw images to see if behavior conforms to expected behavior based on pre-existing calibration. For example, if a straight line between two or more feature points is expected or a particular angle is expected between to feature points relative to horizontal or vertical in certain embodiments, then no straight line or differing angles may indicate calibration is in error. In another embodiment, lines between multiple three dimensional distance points of a plural image frame may be projected with an expected convergence, and if the projected lines do not converge as expected that may indicate loss of calibration. In an example embodiment, several feature point relationships across an image may be analyzed to determine a level of error occurrence within the raw images. A minimum number of feature point comparisons may be required. With more feature point comparisons, higher confidence in the calibration check system may be generated to reject false error indicators or to meet a threshold level of confidence to declare the plural image calibration parameters out of calibration with the plurality of digital cameras. Additional other calibration check methods may be used as well to determine whether calibration has been lost.

If the calibration check system determines that there is no calibration loss of the plurality of digital camera systems, then the flow of method 400 proceeds to block 450 for disparity calculations according to previous calibration parameters. At block 455, disparity data is merged into a plural image frame and the plural image frame is stored. At this point the process would end.

If at decision block 410, at least one of the plurality of digital camera systems is determined to be out of calibration, the flow of method 400 proceeds to block 415. At block 415, the multi-camera error compensating system will flag an acquired plural image frame or its raw image components as out-of-calibration. The out-of-calibration flag designation will be stored with the data for the plural image frame and/or the raw images either of which may be referred to as a plural image. In some instances, a consolidated plural image frame and its component raw images may be stored together as a plural image with a decalibration flag designation. Flow then proceeds to block 420 where the multi-camera error compensating system will access a plurality of stored plural image frames. This will be done to determine if additional plural image frames are also out of calibration. In some embodiments, the multi-camera error compensating system may select only more recently stored plural image frames since those plural image frames may be more likely out of calibration. In other embodiments, the multi-camera error compensating system may also gather any future plural images recorded by the plurality of digital camera systems after the plural image frame discovered to be out-of-calibration since those are likely to be out of calibration as well if recalibration has not yet occurred. Upon acquiring at least one plural image frame having a loss of calibration, the recalibration engine may begin dynamic recalibration of plural image parameters. In some embodiments, one plural image frame may be used for dynamic calibration however it is understood that two or more plural image frames are useful for enhanced reliability of the dynamic recalibration process.

Proceeding to block 425, the multi-camera error compensating system dynamic calibration engine will determine features within the accessed plural image frame or frames. As described above, the image features may include corners, edges and other features with similar intensity, contrast changes, color profiles or the like between raw images comprising the plural image. At block 430, the features are aligned according to multiple depth point references so that similar depth points are aligned. In this way, the images are fit together with respect to depth points within the plural image frames. In an embodiment, several points at depth are utilized as reference points. Based on reference points within the plural image frame or frames, lines of depth may be projected on to a point at theoretical infinity at block 435. Thus the aligned depth reference points for a plural image frame may show alignment of projected depth lines to a theoretical infinity point. This may be repeated with respect to additional plural image frames. The projection from the plurality of depth reference distance points to a theoretical infinity point allows determination of error levels of depth distance, rotation, field of view (e.g., stretch or skew in one or more directions) due to non-convergence of projections to theoretical infinity. In an example embodiment, backward optimization may then be used to correct the convergence from the depth distance reference points for correction to depth distance relationships to pixel shift based on parallax angles from the plurality of digital camera systems. Similarly, rotation deviation from expected angles between sets of feature reference points may be used to backwards optimize rotation parameter values in another example embodiment.

At block 440, plural image calibration parameters may be backwards-optimized based on the multiple depth reference points and convergence projections to a point at theoretical infinity. Based on these multiple depth points from one or more plural frames, alignment for depth distances 441, rotation 442, field of view 443, and focal lengths 444 may be recalibrated with respect to the plurality of digital camera systems. Rotation angles may also be determined based on angle misalignment of a theoretical line between two or more known depth reference points between raw images comprising a dual image frame. Thus, necessary rotation rectification may be determined between the raw images recorded on the plurality of digital camera systems. Similarly, field of view dimensions may stretch, squash or otherwise skew the pixel fields between digital camera systems. Rectification factors for calibration of field of view dimensions relative to pixel arrays between raw images may be similarly be modified based on determination of known reference depth points upon recalibration. With more reference points from more plural image frames, additional reliability of backwards optimization may be made with respect to depth distances relative to parallax camera recording angles, rotation of images with any required rotational rectification, field of view dimensions with necessary rectification for field of view between raw images, and focal length changes or alterations to the digital camera systems.

With these plural image calibration parameters recalibrated by the above procedure, flow may proceed to block 450 where a disparity calculation may be conducted for acquired raw images which may then be consolidated into a plural image frame. Flow may then proceed to block 455 where the disparity data is merged into a final plural image frame and the process may end.

Figure 5:
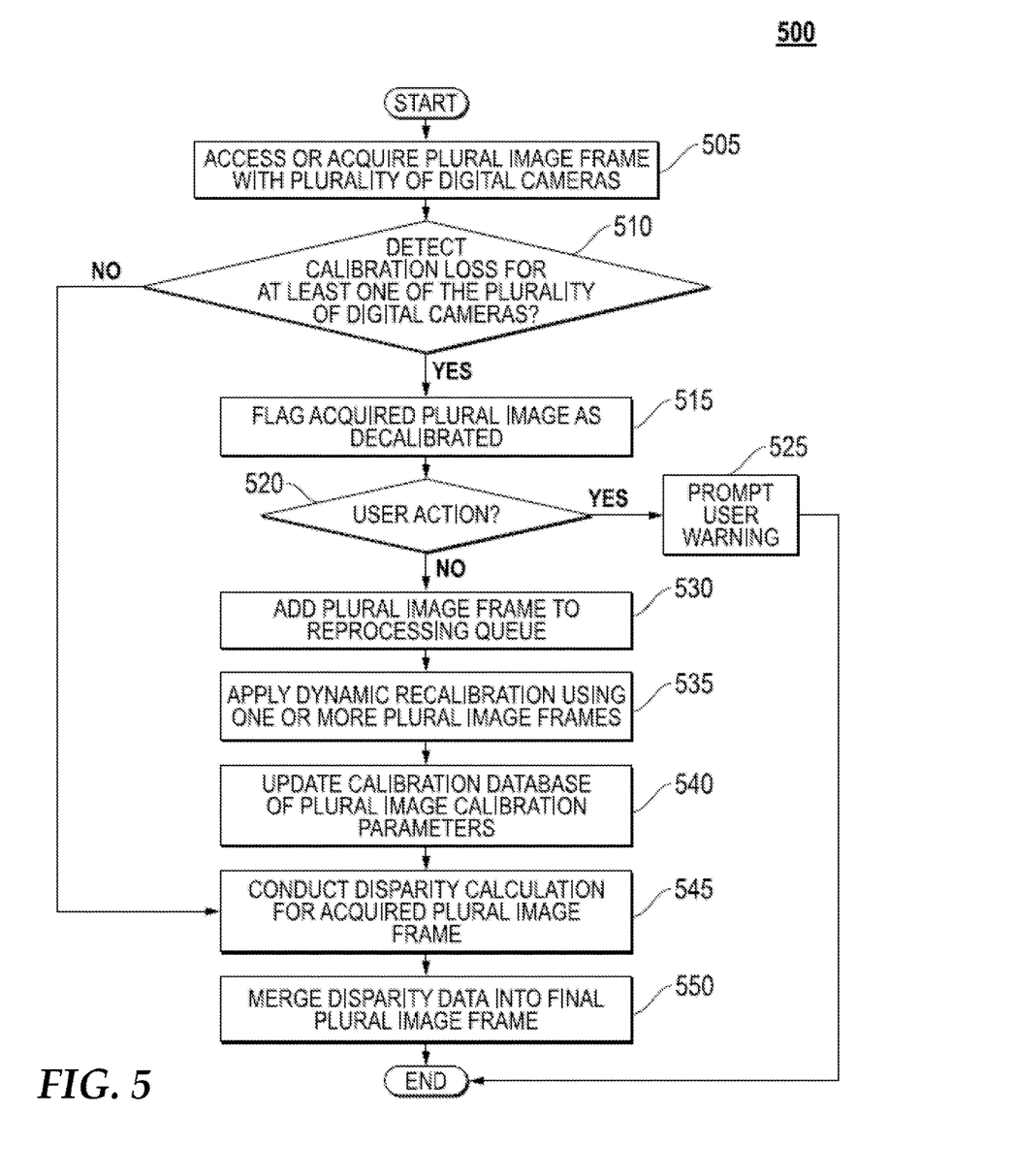
FIG. 5 is a flow diagram illustrating a method of image reprocessing via a multi-camera error compensation system according to an embodiment of the present disclosure.

FIG. 5 is a flow diagram illustrating a method of detecting a state of calibration for a plural image frame and determination of plural image frame reprocessing according to an embodiment of the present disclosure. Method 500 begins in block 505 where a plurality of digital camera systems record raw images and the multi-view stereo imaging system may process those raw images into a plural image frame. In other embodiments, detection of a state of decalibration may begin with accessing previously stored plural image frames instead of a newly recorded plural image frame. This may be done to determine the state of calibration of the plurality of digital camera systems during the previous recording of the stored plural image frame. In other embodiments, a plurality of current and previously recorded plural image frames may be accessed to determine calibration.

Flow proceeds to decision block 510 where a calibration check sub-system may be initiated with respect to one or more stored plural image frames. The calibration check sub-system operates similarly to as described above to make a qualitative determination of whether a plural image frame or its counterpart constituent raw images are out of calibration. As described in embodiments of the present disclosure, calibration check system will analyze correspondences between a plurality of raw images for image size, shape, distortion, rotation and other aspects. Additionally, the correspondences rely on comparison of relative features within the images, such as raw images. In other embodiments, the calibration check system may analyze merged plural image frames with convergences from one or more distance reference points therein.

In an example embodiment, features include corners, edges or other unique and identifiable details in an area of the image based on aspects such as intensity levels, contrast changes, color profiles, or other distinguishing aspects of an area or location in an image. Assessment of calibration is then made with respect to relationship between two or more features in the raw images to see if behavior of angles, lines between features, or other details conform to expected behavior based on pre-existing calibration. For example, no straight line between two or more feature points may indicate loss of calibration in some embodiments. Deviation from an expected angle between two or more feature points relative to horizontal or vertical may indicate loss of calibration in certain other embodiments. Lack of a straight line or differing angles from expected angles may indicate calibration parameters are in error. In another embodiment, projection of lines between multiple three dimensional distance points of a plural image frame that do not reach an expected convergence may indicate loss of calibration. With a nominal number comparison bases including several indicators from any one of the calibration check techniques above or from a combination of any one or more of the above techniques, a required error confidence level may be reached to declare loss of calibration. With more comparison bases indicating calibration error, higher confidence in the calibration check system may be reached. Additional other calibration check methods may be used in addition to the above to determine whether calibration has been lost.

If the calibration check system determines that there is no calibration loss at block 510, then the flow proceeds to block 545 for disparity calculations according to previous calibration parameters. At block 550, merger of disparity data into a consolidated plural image frame is conducted by the multi-view stereo imaging system and the plural image frame is stored. At this point the process would end.

If at decision block 510, at least one of the plurality of digital camera systems is determined to be out of calibration based on at least one plural image frame, the flow proceeds to block 515. At block 515, the multi-camera error compensating system will flag an acquired plural image or its raw image components as out-of-calibration. The out-of-calibration flag designation will be stored with the data for the plural image frame, with the raw images acquired for a plural image, or in a separate information database that records and relates an identifier of the plural image set (frames and raw images) with the calibration status. Flow proceeds to decision block 520 where the multi-camera error compensating system will determine whether a user action has been performed on a stored plural image frame. A user action on a plural image frame is an action to modify or edit the content of the plural image frame, or an action to consume the image or associated disparity data or depth image data for further application uses or processes. In an example embodiment, a user action on a plural image frame may be modification or consumption of a plural image or related data such as with a photo editor. In another embodiment, modification of settings such as exposure settings, focus, color effects, or the like may be a user action to modify or consume a plural image frame. In another embodiment, consumption of the related plural image sub-elements such as disparity or depth information to perform a point-to-point measurement, area measurement, object segmentation, view interpolation, or relighting operation may be a user action to modify or consume a plural image frame. User action on a plural image frame file must be more than merely viewing the two dimensional luminance and chrominance plural image frame components on a display screen. A user action must involve the consumption or potential alteration of the disparity or depth component of the plural image frame. In other embodiments, re-saving a copy without changes, copying, printing, or transmitting a copy of a plural image frame may not rise to the level of a user action on a plural image frame if the depth or disparity components are not consumed or modified. However in some embodiments, these actions may be deemed user action on a plural image frame, especially if they may irreversibly impact any one of the sub-image components of the plural image, such as converting to a different file format that may modify or delete information related to the sub-image components. Settings in the multi-view stereo imaging system may reflect certain activity with a plural image frame file that may meet the threshold requirement for user action on a plural image frame. The multi-view stereo imaging system may determine if modifications or consumptions have been applied to the plural image frame file.

There are several ways in which the multi-view stereo imaging system may determine if modifications may have been made via user action. In an example embodiment, the plural image data may include a plural image frame and raw images data which were consolidated into the plural image frame. Additionally, plural image data may include an array of image versions tracked over time as the plural image frame is opened or accessed. This array of image versions permits comparison between plural image frame versions paired with a time stamp to determine differences between versions. In another embodiment, the raw images originally recorded may be re-consolidated into a plural image frame and compared to the current version of the plural image frame to detect modifications existing in the current plural image frame. In yet another embodiment, a plural image frame may be analyzed in segments. Comparison of factors such as optical path length, image blurring, color transitions, shading or intensity anomalies, or other factors between compared segments of a plural image frame may indicate modification has been made. More than two segments within a plural image frame may be compared. By comparing segments within the plural image frame, computation may be reduced by avoiding analysis of the entire image for comparison. In another embodiment, segments of plural image frames may be compared as between arrays of saved versions of the plural image frames or between the plural image frame and re-consolidation of the raw images. Thus, comparison of one or more segments of each plural image frame version allows for reduction of computation time and resources for comparing the entire plural image frames.

In another embodiment, determination of modification or consumption of a plural image frame or any image sub-elements may be based on a modification or absence of any of the sub-image components of the plural image or an indication that they deviate from the expected values. A modification, in one example embodiment, would be an alteration of the size, aspect ratio, or resolution of any one of the sub-image components. In yet another embodiment, the determination may also be based on a dedicated value in the plural image metadata in, or a value in an external information database, which corresponds to a number of possible modification or consumption events that may be recorded and tracked in quickly indicate a user action.

If user action to modify or consume a flagged plural image frame or plural image sub-elements is confirmed, the multi-camera error compensating system associated with the multi-view stereo imaging system may not add the decalibrated plural image frame to a reprocessing queue for reprocessing after recalibration. The reason for this is that user data may be lost or erased relating to the user action to modify the plural image frame upon reprocessing. Thus, flow proceeds to block 525 where the plural image frame file is saved with an indicator to prompt the user with a warning that the plural image frame file was recorded in an out of calibration state the next time the plural image frame is accessed. Although in some embodiments, the multi-camera error compensating system may run unseen in the background operation of the multi-view stereo imaging system, when a situation arises where interim edits may be lost, the multi-camera error compensating system provides a warning to the user.

In an embodiment not shown in FIG. 5, the multi-camera error compensating system may query the user about whether the user would like the plural image frame to be reprocessed despite interim modifications. With an affirmative response, the flagged plural image frame may then be placed in a reprocessing queue. Otherwise, process may end.

If user action to modify or consume a flagged plural image frame or plural image sub-elements is not detected at decision block 520, the flow proceeds to block 530. At block 530, the multi-camera error compensating system associated with the multi-view stereo imaging system adds the decalibrated plural image frame to a reprocessing queue for reprocessing after recalibration.

It is understood that in other embodiments the determination of a user action to modify or consume the plural image frame or any plural image sub-components may cause the plural image frame to be removed from the reprocessing queue after it had already been placed there. In yet another embodiment, a copy of the flagged plural image frame having had user action to modify or consume it may be placed or remain in the reprocessing queue. However, another copy of the plural image frame and related plural image sub-components is flagged and stored so that a copy of the plural image frame and any modifications to the same is not reprocessed. In that aspect, an identifier or other indication differentiating between the reprocessed plural image frame copy and an un-reprocessed one may be necessary and made known to a user.

At block 535, the multi-camera error compensating system applies dynamic recalibration using one or more plural image frames in accordance with one or more embodiments herein. For example, plural image parameters relating to depth distance, rotation, field of view, or focal point may be recalibrated for the multi-view stereo image system processing.

The plural image calibration parameter database is updated with recalibrated parameters at block 540. Proceeding to block 545, the multi-view stereo imaging system may reprocess the plural image frame using the recalibrated plural image calibration parameters to develop a disparity calculation for the raw images of the plural image frame. At 550, a recalibrated plural image frame is established by merging the disparity date into the consolidated image. At this point the process ends.

Figure 6:
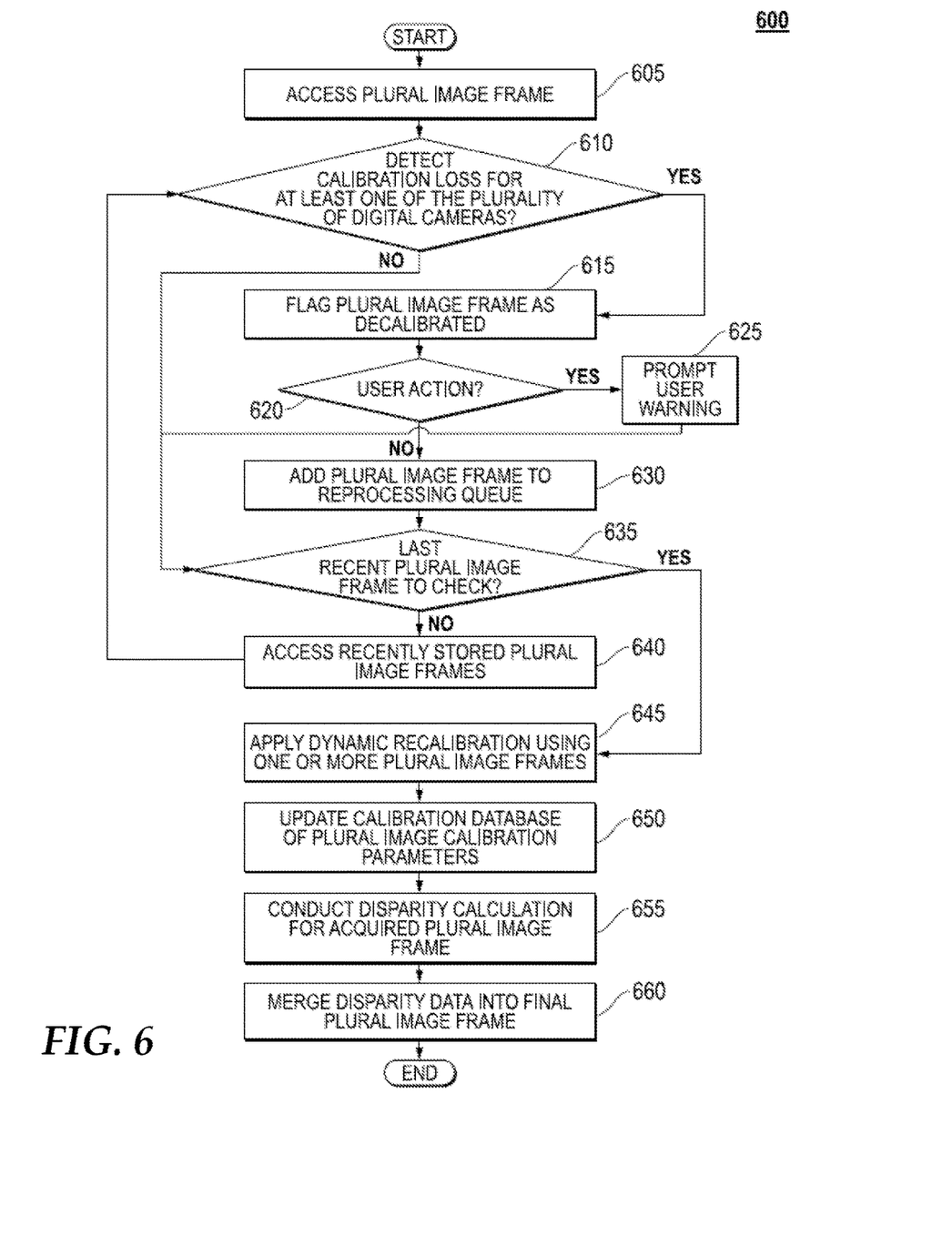
FIG. 6 is a flow diagram illustrating a method of recursive image reprocessing via a multi-camera error compensation system according to an embodiment of the present disclosure.

FIG. 6 is a flow diagram illustrating a method of recursively reprocessing plural image frames determined to be out of calibration according to an embodiment of the present disclosure. Method 600 begins in block 605 where the multi-camera error compensating system accesses one or more plural image frames stored in a plural image database. As described earlier, the plural image frames are processed from raw images acquired by a plurality of digital camera systems of an information handling system. A multi-view stereo imaging system may consolidate the raw images into a plural image frame. In some embodiments, one or more current and previously recorded plural image frames may be accessed to determine calibration status.

Flow proceeds to decision block 610 where a calibration check sub-system may be initiated with respect to one or more stored plural image frames to determine a state of calibration or decalibration of the plurality of digital camera systems with respect to the multi-view stereo imaging system processing. The calibration check sub-system operates similarly to embodiments described above to make a qualitative determination of calibration state for each plural image frame. As described in embodiments of the present disclosure, the calibration check system will analyze correspondences between a plurality of raw images having similar aspects of size, shape, distortion, rotation and other aspects. In other embodiments, the calibration check system will analyze correspondences between a plurality of plural image frames as well to determine with statistical confidence that calibration has been lost between the digital camera systems and the multi-view stereo imaging system.

If the calibration check system determines that there is no calibration loss at block 610, then the flow proceeds to block 635 to determine if this is the last plural image frame to check for calibration.

If the calibration check system determines that there is no calibration loss at block 610, then the flow proceeds to block 615 to flag a plural image frame as decalibrated. The out-of-calibration flag designation will be stored with the data the consolidated plural image frame and for the raw images acquired for a plural image frame, or this designation may be stored in an external information database as described. Flow proceeds to decision block 620 where the multi-camera error compensating system will determine whether a user action has been performed on a stored plural image frame. A user action on a plural image frame is an action to modify or edit the content of the plural image frame, or to consume the image or associated disparity or depth information for further uses and processes. In an example embodiment, a user action on a plural image frame may be modification or consumption such as with a photo editor. In another embodiment, modification of settings such as exposure settings, focus, color effects, or the like may be a user action to modify or consume a plural image frame. In another embodiment, consumption of the related plural image sub-elements such as disparity or depth information to perform a point-to-point measurement, area measurement, object segmentation, view interpolation, or relighting operation may be a user action to modify or consume a plural image frame. User action on a plural image frame file must be more than merely viewing the two dimensional luminance and chrominance plural image frame components on a display screen without any modification. A user action must involve the consumption or potential alteration of the disparity or depth component of the plural image frame.

In some embodiments, certain user actions may or may not sufficiently modify a plural image frame file to amount to a user action modifying a plural image file. Examples are copying, printing, or transmitting a copy of a plural image frame. As described above, user activity such as these examples may be set in the multi-view stereo imaging system as to whether they meet a modification threshold.

If user action to modify or consume a flagged plural image frame is confirmed at decision block 620, the multi-camera error compensating system associated with the multi-view stereo imaging system may not add the decalibrated plural image frame to a reprocessing queue for reprocessing after recalibration. Flow proceeds to block 625 where the plural image frame file is saved with an indicator to prompt the user with a warning that the plural image frame file was recorded in an out of calibration state. In an example embodiment not shown in FIG. 6, the multi-camera error compensating system may query the user about whether the user would like the plural image frame determined to be out of calibration to be reprocessed despite interim modifications. With an affirmative response, the flagged plural image frame may then be placed in a reprocessing queue. Otherwise, the process may move on to decision block 635 to determine if the last plural image to check for calibration.

It is understood that in another embodiment the arrangement of determining whether a user modified plural image frame should be in a reprocessing queue may be made after the plural image frame has been placed in a reprocessing queue. In that aspect, determination of a user action to modify or consume the plural image frame or any plural image sub-components may cause the plural image frame to be removed from the reprocessing queue. In yet another embodiment, a copy of the flagged plural image frame having had user action to modify or consume it may remain in the reprocessing queue or be placed in the reprocessing queue. However, another copy of the plural image frame and related plural image sub-components is flagged and stored so that a copy of the plural image frame is not reprocessed.

If user action to modify or consume a flagged plural image frame or image sub-components is not detected at decision block 620, the flow proceeds to block 630. The multi-camera error compensating system associated with the multi-view stereo imaging system adds the decalibrated plural image frame to a reprocessing queue for reprocessing after recalibration at block 630. Flow then proceeds to block 635 to determine if the current plural image frame analyzed for calibration loss is the last plural image frame to check for calibration. The multi-camera error compensating system may determine if the current plural image frame analyzed for calibration loss is the last in a number of ways. In one embodiment, the plural image frames may be analyzed in reverse chronological order. When a threshold number of reverse sequential plural image frames have no decalibration detected, the multi-camera error compensating system may determine that the last plural image frame to check for calibration has been reached. In another embodiment, a limit may be placed on a time period prior to discovery of a decalibrated plural image frame. The multi-camera error compensating system may check calibration of plural image frames with image creation time stamps up until the time period limit has been reached. At that point the last plural image frame to check for calibration has been reached. Other example embodiments are contemplated as well relating to determining the last stored plural image frame subject to a calibration check.

If the last plural image frame to be checked for calibration has not been reached at decision block 635, flow proceeds to block 640 to access another stored plural image frame. In an embodiment, accessing stored plural image frames may be done in reverse sequential chronological order of time of recording the plural image frame or its component raw images. Thus, the multi-camera error compensating system will access the next most recently recorded plural image frame stored in the plural image database in such an embodiment. In other embodiments, the multi-camera error compensating system may compare the plural image frame creation timestamp with a time limitation placed on the calibration check for plural image frames. Flow then returns to decision diamond 610 to detect calibration loss in the newly accessed plural image frame.

If the last plural image frame to be checked for calibration has been reached at decision block 635, flow proceeds to block 645 where the multi-camera error compensating system may conduct dynamic recalibration via the calibration engine in accordance with embodiments described herein or variations as may be understood. The calibration engine may utilize one or more of the plural image frames or the raw images designated as out of calibration in the preceding steps. Proceeding to block 650, the multi-camera error compensating system updates the calibration data base with recalibrated plural image calibration parameters in accordance with the above described embodiments.

Proceeding to block 655, the multi-view stereo imaging system may reprocess the plural image frame using the recalibrated plural image calibration parameters to develop a disparity calculation. At 660, a recalibrated plural image frame is established by merging the disparity date into the consolidated image. At this point the process ends.

It is understood that in any of the code instruction algorithm methods described in the present disclosure in FIG. 4, 5, or 6 or elsewhere herein, steps for the algorithms described may be omitted or conducted in any order or some steps may be conducted simultaneously. One or more additional steps may also be added in any of the described algorithm methods and any portion of any of the algorithm methods described herein may be combined with any other algorithm method portion as would be understood in the art. The described algorithms are meant as exemplary embodiments and variations to those method algorithms are anticipated in accordance with the present disclosure.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as a processor, an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as an Intel® Core™ or ARM® RISC brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method multi-camera error compensation comprising:

recording a plurality of raw images via a plurality of digital cameras;

consolidating the plurality of raw images into a plural image frame, wherein the plural image frame is a composite image based on blending at least a portion of the plurality of raw images into the composite image;

processing, via a processor executing instructions for a multi-view stereo imaging system, the plural image frame from the raw images captured by the plurality of digital cameras;

storing the plural image frame in a memory; and detecting calibration loss of at least one digital camera via the processor executing instructions for a multi-camera error compensating system via assessment of the plural image frame, conducting dynamic recalibration of plural image calibration parameters based on at least one plural image frame and in response to detection of calibration loss via the multi-camera error compensating system; and the processor reprocessing the plural image frame from a reprocessing queue according to recalibrated plural image parameters.

2. The method of claim 1 further comprising:
identifying the plural image frame as decalibrated.

3. The method of claim 2 wherein the plural image frame identified as decalibrated is added to the reprocessing queue.

4. The method of claim 1 further comprising:
determining whether any user action has been performed to modify or consume the stored plural image.

5. The method of claim 4 further comprising:
adding the stored plural image frame to the reprocessing queue if no user action has been performed to modify or consume the stored plural image.

6. The method of claim 4 wherein the user action performed to modify the stored plural image includes an editing function performed on the stored plural image frame that is more than merely viewing the plural image frame.

7. The method of claim 4 further comprising:
exempting the stored plural image frame from the reprocessing queue if the plural image frame has been modified by user action; and
warning a user of decalibration upon a user accessing the decalibrated plural image frame.

8. An information handling system comprising:
a plurality of digital cameras for recording raw images for consolidation into a plural image frame, wherein the plural image frame is a composite image based on blending at least a portion of a plurality of raw images consolidated to form the plural image frame;
a processor operatively coupled to the plurality of digital cameras for processing plural imaging functions via execution of instructions for a multi-view stereo imaging system;
a memory operatively coupled to the processor, the memory for storing the plural image frame;
the processor executing instructions for a multi-camera error compensating system to conduct detection of calibration loss of at least one digital camera via assessment of the plural image frame;
the multi-camera error compensating system conducting dynamic recalibration of plural image calibration parameters based on at least one plural image frame and in response to detection of calibration loss; and
the processor identifying the plural image frame as decalibrated, determining if any user action has been performed to modify the plural image frame, and storing an indication of image modification for assessment of reprocessing eligibility of the plural image frame.

9. The information handling system of claim 8 wherein the processor operatively coupled to the plurality of digital cameras for processing plural imaging functions includes three-dimensional (3D) imaging by determination of depth values for parts of the plural image frame.

10. The information handling system of claim 8 wherein the plural image calibration parameters dynamically recalibrated includes depth distance for objects recorded in the plural image frame.

11. The information handling system of claim 8 further comprising:
the multi-camera error compensating system reprocessing the plural image frame according to recalibrated plural image parameters.

12. The information handling system of claim 11 further comprising:
the multi-camera error compensating system reprocessing one or more decalibrated plural image frames stored in memory by re-determining depth values in the plural image frame.

13. The information handling system of claim 8 wherein the multi-camera error compensating system flags plural image frames identified as decalibrated and stores the decalibrated flag designations in memory.

14. The information handling system of claim 8 further comprising:
the multi-camera error compensating system warning a user of decalibration upon a user accessing decalibrated plural image frame that has been modified by user action.

15. A method for multi-camera error compensation comprising:
recording a plurality of raw images via a plurality of digital cameras;
consolidating the plurality of raw images into a plural image frame, wherein the plural image frame is a composite image based on at least a portion of the plurality of raw images;
processing, via a processor executing instructions for a multi-view stereo imaging system, the plural image frame from the raw images captured by the plurality of digital cameras;
storing the plural image frame in a memory;
detecting calibration loss of at least one digital camera via the processor executing instructions for a multi-camera error compensating system via assessing the plural image frame;
executing dynamic recalibration of plural image calibration parameters stored in memory based on at least one plural image frame and in response to detection of calibration loss; and
identifying the plural image frame as decalibrated, determining if any user action has been performed to modify the plural image frame, and storing an indication of image modification for assessment of reprocessing eligibility of the plural image frame.

16. The method of claim 15 wherein the processing plural image frame from the raw images captured by the plurality of digital cameras includes determination of a depth values for three-dimensional (3D) image processing of the plural image frame.

17. The method of claim 15 further comprising:
flagging one or more plural image frames as decalibrated and storing the decalibration flag designation in memory.

18. The method of claim 15 further comprising:
identifying one or more plural image frames as decalibrated; and
if the decalibrated plural image frame that has been modified by user action, warning a user of decalibration upon accessing the decalibrated plural image frame.

19. The method of claim 15 further comprising:
reprocessing one or more decalibrated plural image frames in memory by re-determining depth values in the plural image frame according to recalibrated plural image parameters.

20. The method of claim 15 further comprising:
identifying a plurality of stored plural image frames as decalibrated; and
recursively reprocessing each of the plurality of identified plural image frames identified as decalibrated according to recalibrated plural image calibration parameters if no user action has been performed to modify the plural image frame identified as decalibrated.

* * * * *